Patented Sept. 15, 1931

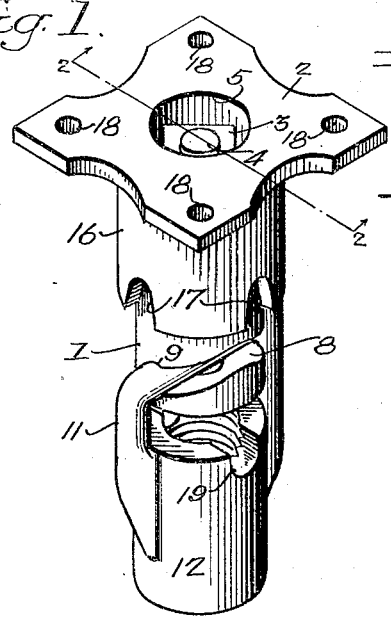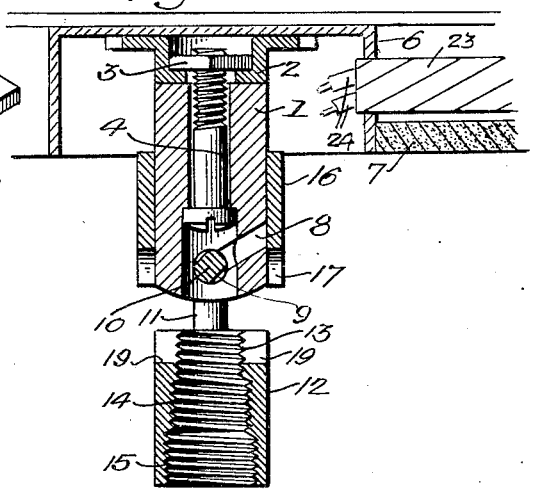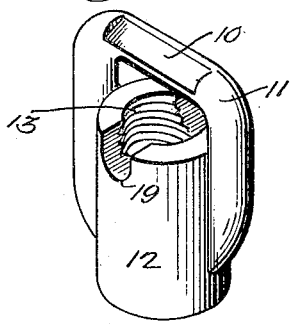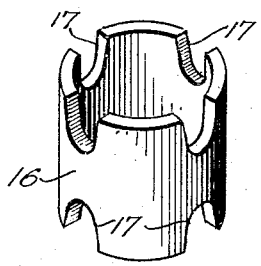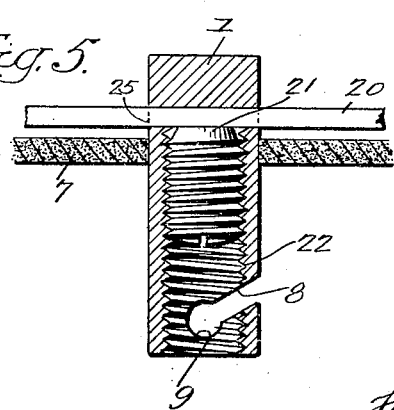

1,823,619

UNITED STATES PATENT OFFICE

JAMES MANGIN, OF NEW BRUNSWICK, NEW JERSEY

HANGING FIXTURE CONNECTER

Application filed December 4, 1929. Serial No. 411,530.

The present invention relates to electrical fixture connecters and particularly refers to hanging fixture connecters although it is within the scope of the invention to use the connecter with wall fixtures or fittings.

The principal object of my invention is to provide a connecter which, when fastened to an outlet box, will permit a fixture to hang plumb when suspended from a ceiling, even though the outlet box may be slightly disaligned, or to permit the fixture to be aligned perpendicularly with a wall.

Another object of the invention is to provide a connecter which may be quickly and easily assembled when positioned in an outlet box and which may be easily locked after it is positioned in the outlet box.

A further object of the invention is to provide a simple and effective locking means in a connecter.

Another object is to provide a connecter which is threaded to receive fixtures of various diameters.

Other objects and advantages of my invention will appear more fully hereinafter from the following detailed description taken together with the accompanying drawings, in which:

Fig. 1 is a perspective view of my improved connecter;

Fig. 2 is a sectional view of the connecter taken along the line 2—2 of Fig. 1 showing the connecter positioned in an outlet box and suspended from a ceiling;

Fig. 3 is a perspective view of the locking device of the connecter;

Fig. 4 is a perspective view of the sleeve for additionally locking the connecter; and Fig. 5 is a sectional view of a modification of my connecter adapted for use with a bar hanger instead of an outlet box.

Referring to Figs. 1 to 5, the connecter comprises a hollow cylindrical supporting member 1 which may be attached to a bracket 2 by means of the bolt 4 and nut 3. The bracket 2 is adapted to be fastened to the outlet box 6 by means of rivets, bolts or screws passing through the holes 18 in the bracket. The cylindrical supporting member 1 is provided with a transverse angular slot 8 terminating in a groove 9 for the reception of the yoke 11 of a cylindrical member 12 which constitutes the connecter proper. The yoke 11 may be made integral with the cylindrical member 12 and is also of cylindrical contour except for the transverse portion 10 thereof which is flattened as indicated in Fig. 3 and in the cross-section thereof in Fig. 2, so that it may easily be inserted in the slot 8 and permitted to slide into the groove 9. The flattened portion 10 is arranged at an angle of approximately 45° from the vertical so that the cylindrical member 12 must be held at that angle in order to insert the yoke into the slot 8. After it is inserted into the slot and seated in the groove 9, the member 12 is permitted to drop into vertical position, or in substantial alignment with the member 1 when the outlet box is positioned in a wall, due to the circular cross-section of the groove which is slightly larger than the diameter of the yoke 11 and larger than the slot 8. The yoke 11 is free to move in the groove 9, so that the member 12 will always hang in a true vertical position, when suspended from a ceiling in spite of any slight disalignment from the vertical of the cylindrical supporting member 1 due to the wall box 6 being out of possible alignment in its horizontal position, or will be substantially in alignment with member 1 when attached to a wall so that a fixture connected thereto will be substantially perpendicular to the wall.

As shown in Fig. 2, the member 12 will hang in a true vertical position only if the disalignment of the cylindrical body 1 occurs in a plane coinciding with the plane of the section. If the disalignment should occur perpendicular to the plane of the section, the cylindrical supporting member 1 may then be rotated by loosening the nut 3 on the bolt 4 until the yoke 11 is perpendicular to the plane in which the disalignment occurs. Due to the flattened portion 10 of the yoke 11 being at an angle, the yoke cannot be removed from the groove 9 until the member 12 is turned into such a position that the flattened sides of the yoke are parallel with the sides of the slot 8. This provides an effective locking means for the connecter. An additional locking means may be provided, which comprises a cylindrical sleeve 16 adapted to fit over the supporting member 1 and to slide thereon so that it may be raised when the yoke 11 is being inserted into the slot 8 and after the yoke is in the groove 9, the sleeve 16 may be lowered so that a pair of diametrically opposite recesses 17 will engage the yoke 11. The recesses 17 are flared so as to provide a clearance for the movement of the yoke when the sleeve is in engagement therewith.

The member 12 is threaded internally with progressively increasing diameters of the threads from the upper end of the member to the lower end, as indicated in Fig. 2, the various diameters of the threads being indicated at 13, 14 and 15. These threaded portions of different diameters are provided so that fixtures of various diameters may be inserted therein without having to provide a different member 12 for each size of fixture.

Recesses 19 are provided in the upper end of the cylindrical member 12 for the seating of the connecting lead wires 24 therein in order that they may not interfere with the movement of the yoke 11 by rubbing against the lower end of the cylindrical member 1. The connecting wires 24, which are shown in Fig. 2 coming out of the BX cable 23, are withdrawn from the outlet box and passed underneath the supporting member 1 and into the cylindrical member 12 through one of the recesses 19 to be connected to a fixture.

In Fig. 5 is shown a modification of the cylindrical supporting member which is provided with a transverse slot 25 so that it may be supported from a bar hanger 20, as indicated. The member is threaded on the inside for the reception of a set screw which is provided for locking the member against the bar hanger 20.

While I have shown only two embodiments of my invention for the purposes of illustration and description, other changes and modifications thereof may be apparent to those skilled in the art without departing from the scope of the invention and I, therefore, desire to be limited only by the scope of the appended claims.

I claim:

1. An electrical hanging fixture connecter, comprising a supporting member, a connecter member co-acting with said supporting member, means for loosely coupling said members comprising a slot in said supporting member for the reception of a connecting portion of said connecter member, and locking means slidable along said supporting member adapted to engage and lock said connecting portion to prevent the de-coupling of said members.

2. The combination in an electrical fixture connecter, of a supporting member, a connecter member co-acting with said supporting member, means for loosely coupling said members comprising a transverse slot in said supporting member for the reception of a yoke on said connecter member, and locking means slidable along said supporting member adapted to engage and lock the yoke whereby said yoke is prevented from being forced out of the slot.

3. The combination in an electrical fixture connecter, of a supporting member, a connecter member co-acting with said supporting member, means for loosely coupling said members comprising a transverse slot in said supporting member terminating in a groove of circular cross-section, and a yoke of circular cross-section integral with said connecter member and having a flattened portion adapted to be passed through said slot and seated in said groove.

4. The combination in an electrical fixture connecter, of a supporting member, a connecter member co-acting with said supporting member, means for loosely coupling said members comprising a transverse slot in said supporting member terminating in a groove of circular cross-section, a yoke of circular cross-section integral with said connecter member and having a flattened portion adapted to be passed through said slot and seated in said groove, and means adapted to engage said yoke and lock it in said groove.

5. The combination with an outlet box provided with lead wires, of a supporting member located in said outlet box, a connecter member co-acting with said supporting member adapted to receive said lead wires and provided with means for receiving fixtures of various diameters, means for loosely coupling said members comprising a transverse slot in said supporting member terminating in a groove of circular cross section, a yoke of circular cross section integral with said connecter member and having a flattened portion adapted to be passed through said slot and seated in said groove, and a cylindrical sleeve slidable on said supporting member having diametrically opposed recesses adapted to engage said yoke whereby said yoke is rotatably held in said groove.

6. The combination in an electrical fixture connecter of a supporting member having a transverse opening terminating in a groove, a coupling member adapted to receive a fixture and having a supporting bar adapted for insertion through said opening into said groove only when said coupling member is disposed at an angle to the longitudinal axis of said supporting member, whereby said bar is prevented from being dislodged from said opening when the coupling member is in substantial alignment with said supporting member.

7. The combination in an electrical fixture connecter of a supporting member having a transverse slot terminating in a groove, a coupling member adapted to receive a fixture and having a yoke adapted for insertion into the groove through said slot only at an angle relative to the longitudinal axis of the supporting member, whereby said yoke is prevented from being forced out of the groove after the coupling member is in substantial alignment with said supporting member, and a sleeve slidable on said supporting member adapted to engage said yoke and lock it in said groove.

8. The combination with an outlet box provided with lead wires, of a tubular supporting member having a transverse slot disposed at an angle to the longitudinal axis of said supporting member and terminating in a groove, means for adjusting said member for disalignment of said outlet box in one direction and a tubular connecter member adapted to receive said lead wires and having a yoke which is flattened along its transverse portion for insertion into said groove through said slot only when said connecter is disposed at an angle to the longitudinal axis of said tubular supporting member to prevent said yoke from being dislodged from said groove after it is seated therein and to afford an adjustment for disalignment of said outlet box in a direction perpendicular to said first disalignment whereby a fixture inserted in said connecter member may be disposed in substantial perpendicular relation with the partition in which the outlet box is located.

JAMES MANGIN.